United States Patent
Miaskiewicz, Jr. et al.

(10) Patent No.: US 6,951,301 B2
(45) Date of Patent: Oct. 4, 2005

(54) COMBINATION CLOSURE AND TEAR TAPE, PACKAGING MATERIALS CONTAINING IT, AND METHOD OF USING IT TO SEAL AND LATER OPEN PACKAGES

(75) Inventors: Ronald Edmund Miaskiewicz, Jr., Taga Cay, SC (US); Raja Krishnamurthy, Bangalore (IN)

(73) Assignee: tesa Aktiengesellschaft, Hamburg (DE)

( * ) Notice: Subject to any disclaimer, the term of this patent is extended or adjusted under 35 U.S.C. 154(b) by 179 days.

(21) Appl. No.: 10/344,011

(22) PCT Filed: Dec. 4, 2002

(86) PCT No.: PCT/US02/38617

§ 371 (c)(1),
(2), (4) Date: Feb. 5, 2003

(87) PCT Pub. No.: WO03/048262

PCT Pub. Date: Jun. 12, 2003

(65) Prior Publication Data

US 2004/0041013 A1 Mar. 4, 2004

Related U.S. Application Data

(60) Provisional application No. 60/336,642, filed on Dec. 4, 2001.

(51) Int. Cl.⁷ .......................... B65D 17/00; B32B 27/00
(52) U.S. Cl. .................. 229/238; 229/125.37; 229/309; 229/310; 229/924; 229/926; 428/34.2; 428/41.8; 428/43

(58) Field of Search .................. 229/125.37, 125.38, 229/238, 239, 309, 310, 311, 312, 924, 926; 428/34.2, 41.8, 43, 189

(56) References Cited

U.S. PATENT DOCUMENTS

| | | | | |
|---|---|---|---|---|
| 3,599,859 A | * | 8/1971 | Maierson | 229/238 |
| 5,296,277 A | * | 3/1994 | Wilson et al. | 428/40.2 |
| 5,429,576 A | * | 7/1995 | Doderer-Winkler | 493/214 |
| 5,486,389 A | * | 1/1996 | Gerber | 428/41.9 |
| 5,505,376 A | * | 4/1996 | Kent et al. | 229/311 |
| 5,683,029 A | | 11/1997 | Lyons | 229/309 |
| 6,001,471 A | | 12/1999 | Bries et al. | |
| 6,133,391 A | * | 10/2000 | Nielson et al. | 206/524 |
| 6,416,604 B1 | * | 7/2002 | Nootbaar et al. | 428/41.7 |
| 6,637,697 B1 | * | 10/2003 | Wienberg | 428/343 |

FOREIGN PATENT DOCUMENTS

| | | | | |
|---|---|---|---|---|
| GB | 2 217 295 A | | 10/1989 | B65D/27/16 |
| GB | 2271295 A | * | 10/1989 | |

* cited by examiner

Primary Examiner—Gary E. Elkins
(74) Attorney, Agent, or Firm—Norris McLaughlin & Marcus PA

(57) ABSTRACT

A combination closure tape and tear strip, an object comprising the combination closure tape and tear strip, and a method of sealing and later opening said object utilizing the combination closure tape and tear strip are disclosed.

26 Claims, 4 Drawing Sheets

COMBINATION CLOSURE AND TEAR TAPE, PACKAGING MATERIALS CONTAINING IT, AND METHOD OF USING IT TO SEAL AND LATER OPEN PACKAGES

This application is a 371 of PCT/US02/38617, filed on Dec. 4, 2002 which claims benefit of 60/336,642 filed Dec. 4, 2001.

BACKGROUND OF THE INVENTION

1. Field of the Invention

The present invention relates to an adhesive tape capable of both sealing and opening objects, for example, packages, such as envelopes and boxes.

2. Description of Related Art

It is known to seal and later open objects, for example envelopes and boxes, using closure tapes to seal the object, and separate tear tapes to open the object later. The manufacture of such objects entails two separate steps, one to place the closure tape, and a second to place the tear strip.

Adhesive tapes which are purportedly useful both to seal and later to open objects are known from U.S. Pat. No. 5,683,029. The invention described therein involves the use of a single piece of double-sided adhesive tape to perform both sealing and opening functions. In practice, however, the opening functions have not always been successfully carried out and the object often fails to open.

SUMMARY OF THE INVENTION

The present invention relates in a first embodiment to an adhesive tape comprising:

a) a double-sided adhesive closure tape comprising a backing and pressure-sensitive adhesive applied to both sides of said backing;

b) a tear strip laminated onto a first side of said double-sided adhesive closure tape; and c) optionally, a releasable liner placed on said first side of said double-sided adhesive closure tape.

The present invention relates in a second embodiment to an object comprising an adhesive tape according to the present invention.

The present invention relates in a third embodiment to a method of sealing and later opening the object comprising:

a) providing an object with an adhesive tape according to the present invention;

b) pressing on at least the double-sided adhesive closure tape to seal the object; and c) pulling on at least the tear strip to open the object.

BRIEF DESCRITION OF THE DRAWINGS

In the drawings, which illustrate selected embodiments of the present invention:

DETAILED DESCRIPTION OF DEPICTED EMBODIMENTS OF THE PRESENT INVENTION

Figure 1:
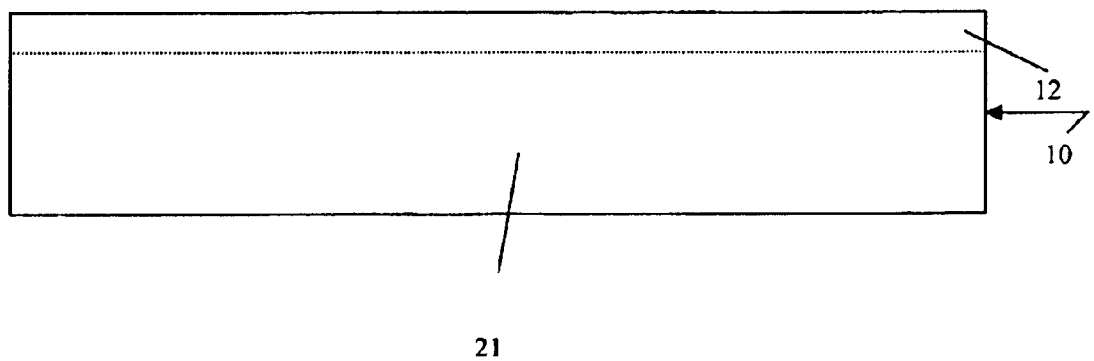
FIG. 1 is a top view of an adhesive tape according to the present invention.

Referring now to the embodiments shown in the drawings, FIG. 1 depicts one possible construction of an adhesive tape according to the present invention. In this particular embodiment, adhesive tape 10 is made up of tear strip 12 laminated onto one side of closure tape 11. As depicted, tear strip 12 is aligned along one edge of closure tape 11. Other constructions are, however, possible, and would readily occur to persons skilled in the art. In an alternate embodiment described below, the tear strip is located away from the edges of the closure tape. Optionally, a release liner 21 is adhered to the same side of closure tape 11 which carries the tear strip 12.

Figure 2:
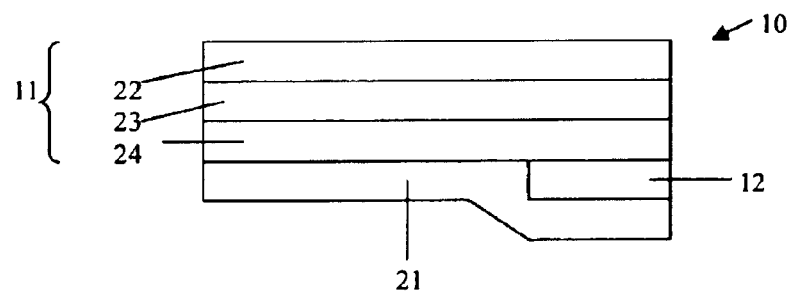
FIG. 2 is a cross-section view of the adhesive tape shown in FIG. 1.

One possible construction of the embodiment shown in FIG. 1 is shown in greater detail in FIG. 2. It should be clear from FIG. 2 that the adhesive tape shown in FIG. 1 consists of a plurality of distinct layers. According to the construction shown in FIG. 2, the closure tape 11 comprises a backing layer 23 having pressure-sensitive adhesive layers 22 and 24 applied to both sides. Optionally, one of the pressure-sensitive adhesive layers, in this case pressure-sensitive adhesive layer 24, has a release liner 21 adhered thereto. According to this particular construction, tear strip 12 is laminated to closure tape 11. In addition to the layers depicted in FIG. 2, it is possible to include additional layers as desired.

FIG. 2 depicts a special, but optional, feature of the present invention. It should be understood that the drawing is schematic and the width of the layers depicted is greatly exaggerated in order to show the structure. As depicted, the width of release liner 21 is essentially equal to the width of closure tape 11. However, as the portion of the width of the tape 11 bearing the tear strip 12 does not have exposed adhesive, the release liner 21 adheres releasably to the side of the tape only up to edge of the portion bearing the tear strip. The extended portion of release liner 21 reaching into and over the width portion bearing the tear strip thus remains free of adhesive contact and so provides a so-called "finger lift," which can make it easier for consumers to remove the release liner and expose the sticky surface of the closure tape. While this effect can be achieved so long as the release liner extends at least somewhat into the region of the tear strip, by extending the liner over the entire tear strip to at least the edge of the tape itself, a larger gripping portion can be achieved. In a preferred embodiment shown in FIGS. 1 and 2, the liner is coextensive width-wise with the tape so as to provide a uniform structure and appearance. Thus, the present invention is advantageous compared to prior systems, in that it does not need to provide "extra" release liner extending beyond the perimeter of the closure tape in order to allow a free region for gripping—the tear strip portion of the tape is a natural basis for this within the boundaries of the tape itself. The extended portion of the release liner 21 can also be provided on either or both sides of the tape to provide a "right finger lift," a "left finger lift" or "a right and left finger lift" as desired.

Figure 2A:
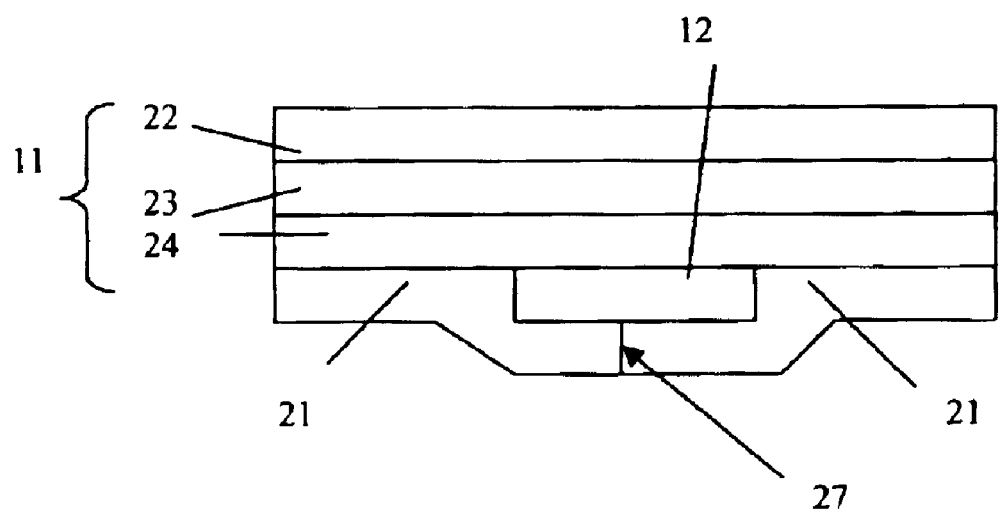
FIG. 2A is a cross-section view of an alternative embodiment of an adhesive tape of the invetion, in which the tear strip is located away from the tape edge.

An alternate embodiment is shown in FIG. 2A in which like reference numerals relate to parallel structures as in FIG. 2. In this embodiment, the tear strip need not be located adjacent an edge of the closure tape; rather, it can be located centrally or at any location in between the two edges of the closure tape. In order to allow for a 'finger lift' for the release liner, an opening (preferably longitidunal) should be provided in the release liner at a location of the liner which lies above the tear tape. This location will also be away from the adhesive of the closure tape because of the intervening presence of the tear strip. To achieve this effect most efficiently, the release liner may be provided as two separate, parallel strips, each of which reaches from either respective edge of the closure tape to at least the region of the tear strip. The two release liners may be spaced apart at their respective edges residing in the tear strip region (which would leave at least a portion of the tear strip exposed therebetween, may touch at their edges, or may even overlap. In each of these cases, however, a finger lift may be easily effected since each of the strips will lie at least in part over the adhesive free face of the tear strip. It should also be understood that, even if the tear strip is located adjacent the edge of the closure tape, a system of two parallel liners (or split liner described below) may be employed.

In a preferred embodiment, where the tear strip is located away from both edges of the tear strip, a so-called 'split' release liner can be employed. As shown in FIG. 2A, the release liner 21 is split into two portions, with the split or separation of the liner located at 27. The split release liner may be applied in the form of a unitary release liner which has a wide perforation, which allows for one step application of the release liner from a single roll to the assembly. The wide perforation maintains the unitary integrity of the liner during storage and application, but allows for the insertion of a finger or other lifting device in order to then grip the liner for removal. Other means of application are also contemplated. In addition to the concept of applying two parallel tapes as discussed above, a unitary scored liner can be applied. The score may be constructed so that it upholds the integrity of the liner during storage and application, but allows for the liner to separate at the score line in order to effect the finger pull. The liner can also be scored after application to the tape. The 'split' may also be defined to encompass a spaced-apart orientation of the embodiment of two parallel release liners.

It is also noted that the liner can be applied to a version of the tape combination where the tear tape is located away from the tape edges, where the liner does not have a split for a finger lift access. However, in this case, an alternate finger lift means would have to be provided, such as an extension of the release liner beyond the elongate end of the closure tape on the package.

Another advantage of the present invention lies in the relative simplicity of manufacture compared to the prior art two part system. In the prior system, the tear strip is held to the package, separately from the closure tape, by means of an adhesive applied to the tear strip. In the present invention, the tear strip is applied directly to the adhesive of the closure tape. Therefore, there is no need to apply a separate adhesive to the tear strip, and there is no need for an extra step of applying the tear strip to the package. The combination tape is applied to the package in a single step.

The use of a release liner permits the adhesive tape to be rolled into rolls, which are convenient for use. Given the generally narrow width of the adhesive tapes, it is possible to "spool," or traverse-wind, a number of rolls of adhesive tape one on top of another, which can help to reduce the number of roll changeover operations. The length of a spooled roll can equal the length of any number of individual, or "pancake," rolls. For example, a spooled roll can contain generally 60–100 pancake rolls.

Pressure-sensitive adhesive compositions are well known in the art (see, for example, Samuel C. Temin, "Pressure-Sensitive Adhesives for Tapes and Labels," in *Handbook of Adhesives,* Third Edition, Edited by Irving Skeist, Chapman & Hall, New York, 1990, pages 641–663), and the selection thereof for pressure-sensitive adhesive layers 22 and 24 is not critical. The adhesive compositions of both layers can be the same or different as desired. Suitable pressure-sensitive adhesives include, merely for example, acrylic pressure-sensitive adhesives, natural rubber pressure-sensitive adhesives, synthetic rubber pressure-sensitive adhesives, polyurethane pressure-sensitive adhesives, and ethylene/vinyl acetate pressure-sensitive adhesives. Pressure-sensitive adhesives applied "on site," such as hot melt coatings or water-based coatings applied to the backings on the process machine, are also included.

Backings for adhesive closure tapes and materials for tear strips are also well known in the art, and the selection thereof also is not critical so long as the closure and tear functions, respectfully, can be successfully carried out. Especially, the tear strip should be selected so that it is capable of actually tearing the package to which the adhesive tape is applied. Perforating the package at appropriate points to serve as a tearing aid can help to facilitate opening and, also, to reduce the strength required of the tear strip. To initiate the opening of the package, it is not necessary to perforate along the entire length of the tear strip, but, as is well known in the art, in the vicinity of one or both ends of the tear strips. Also, the tear strength of the tear strip can be adjusted as desired by varying the width of the tear strip used. For example, the width of the tear strip could be 4 mm for box opening and 3 mm for envelope opening.

In the tape of this particular invention, it is noted that the unique operation of the tear strip in relation to the tape requires the tape to have certain strength considerations. In existing tape and tear strip combinations, the tape and tear strip are offset from each other, so that the opening of the package is effected by way of the tear strip pulling through the package itself, while the taped portion remains fixed. This results, at least to some degree, based on the strength of the tape and its backing.

In the present application, the tear strip must pull away from the tape itself in order to pull through and open the package. Accordingly, the tape backing must be sufficiently strong to support the adhesive coatings applied thereto, and to retain structural integrity during the manufacture and use thereof. However, the tape backing must not be so strong as to prevent the tear strip from pulling away therefrom upon reasonable application of reasonable opening force. For this purpose, it is contemplated that a so-called tissue tape may be used. Alternatively, a transfer tape may be used as the backing.

In another embodiment of the invention, the need for the tape backing itself can be avoided as an adhesive film can be applied directly to the surface of the package in the form of a strip, with the tear strip and release liner then applied on top of the free side of the adhesive strip facing away from the package surface, in the same manner as above.

Materials for tear strips can be selected from paper, films, fabrics and foils, reinforced or not as needed, so long as, again, the tear functions, can be successfully carried out. The suitable substrates for tear strips include tensilized polypropylene or other high strength films, filaments, string and metallic strips. Backings for adhesive closure tapes and materials for tear strips can be colored as desired.

The pressure-sensitive adhesive compositions can be applied to the backing in any of a number of known methods. For example, the pressure-sensitive adhesive compositions can be coated onto the backings or, if the bottom layer is pressure-sensitive adhesive, onto the release liner from a solution. It is also possible to apply the pressure-sensitive adhesive composition as a hot melt using either a hot melt coater, a calendar, or an extruder.

The thickness of the various layers can be varied to a great extent depending on the materials utilized. In general, the thickness of the closure tape ranges from 30 to 300 microns, and the thickness of the tear strip ranges from 30 to 250 microns, as desired.

In similar manner, the widths of the components of the adhesive tape can also be varied as desired. In general, the width of the closure tape ranges from 8 to 50 millimeters, and the width of the tear strip ranges from 2 to 5 millimeters, again, as desired.

For the release liner, suitable materials are well known in the art and the choice thereof is not critical. The release liner is coated with a material to which the pressure-sensitive adhesive composition adheres poorly. Suitable materials include silicone release coating or non-silicone release coatings, such as waxes, soaps and any other suitable materials well known in the art.

In operation of the embodiment described above, the adhesive tape can be applied to objects of all types, for example, packages, such as envelopes and boxes, to provide a more efficient and reliable means of closing and later opening such objects. The present invention includes both unsealed and sealed objects, for example, unsealed and sealed packages, such as unsealed and sealed envelopes and boxes.

Figure 3:
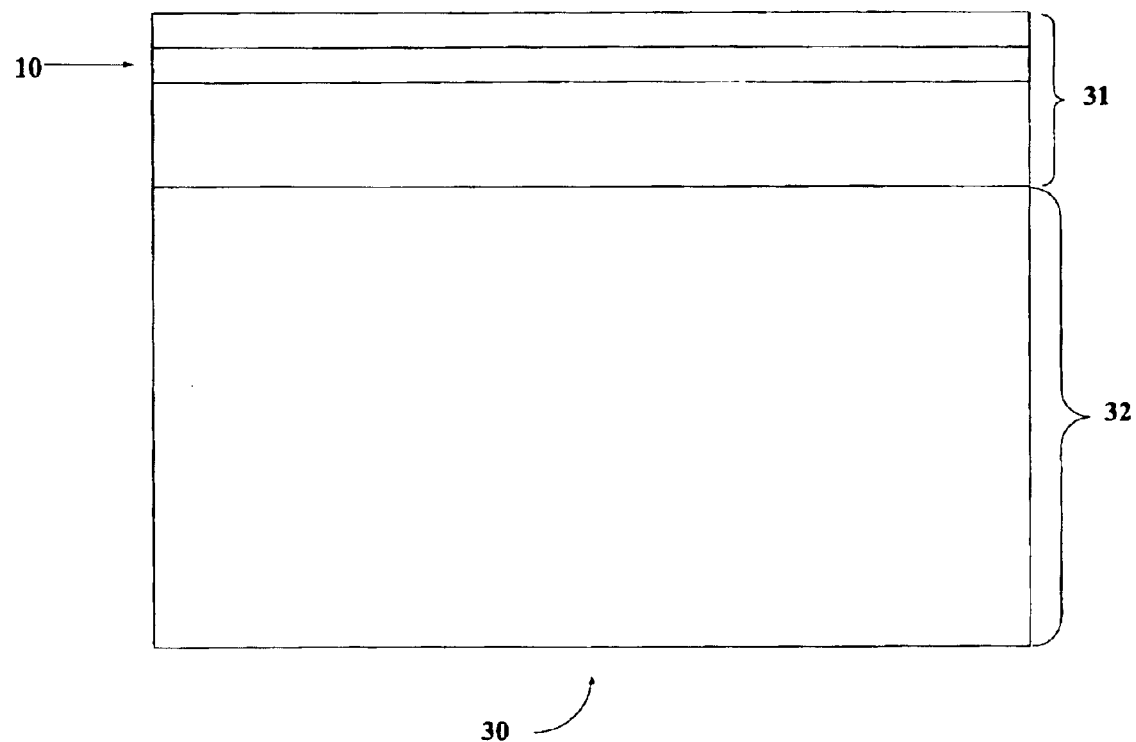
FIG. 3 is a drawing depicting an envelope including the adhesive tape shown in FIG. 1.

In one embodiment, which is depicted in FIG. 3, envelope 30 comprising a flap portion 31 and a container portion 32 also comprises adhesive tape 10 applied strategically across a portion of flap portion 31 deemed best to provide good closure and reliable opening. As alluded to previously, flap portion 31 may be perforated along either or both sides of adhesive tape 10 along the entire length or a portion thereof to facilitate later opening of the sealed envelope, and, in general, it is best that the length of the adhesive tape 10 is less than that of the package to which it is applied.

Figure 4:
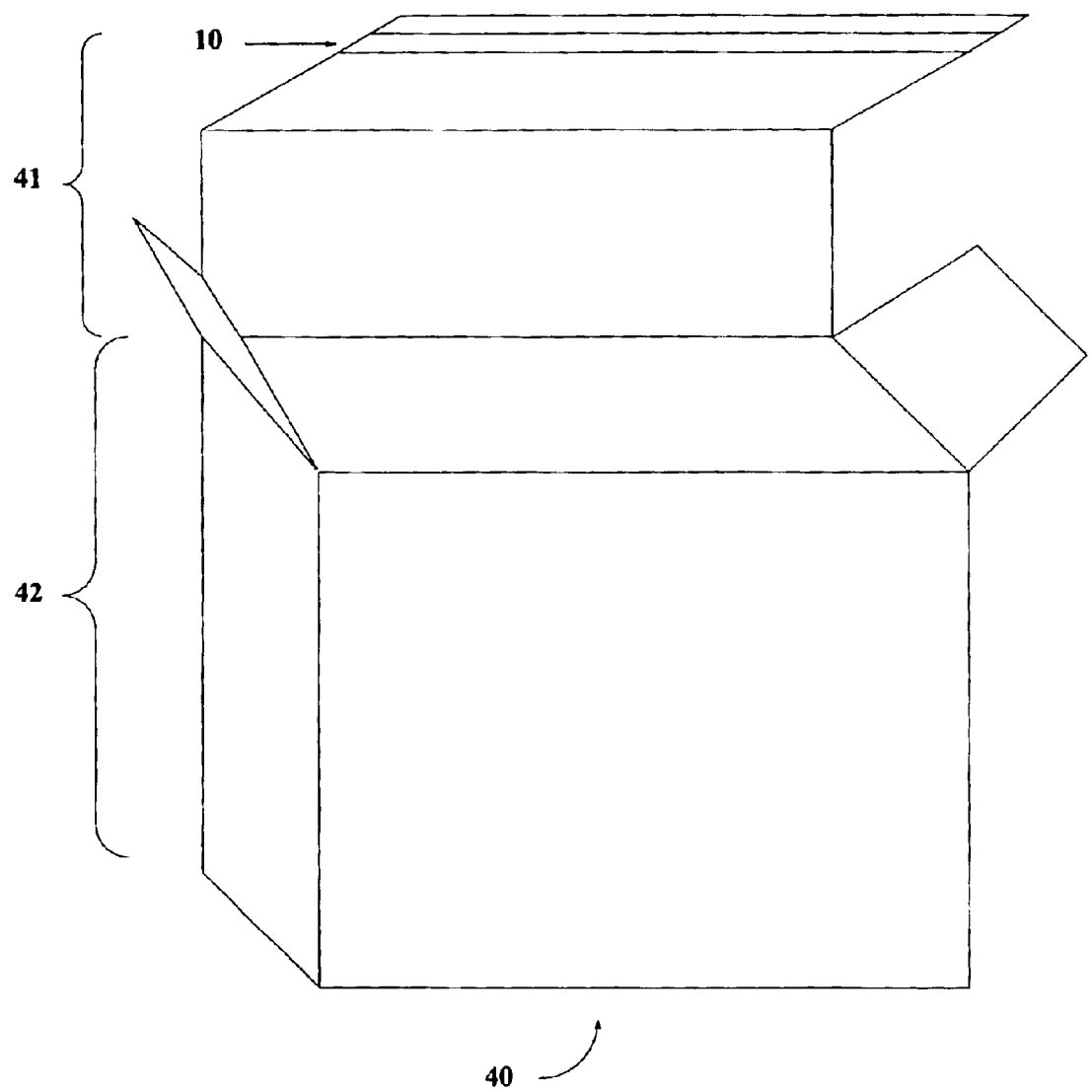
FIG. 4 is a drawing depicting a box including the adhesive tape shown in FIG. 1.

In another embodiment, which is depicted in FIG. 4, box 40 comprising a flap portion 41 and a container portion 42 also comprises adhesive tape 10 applied across a portion of flap portion 41. Again, flap portion 41 may be perforated along either or both sides of adhesive tape 10 along the entire length or a portion thereof to facilitate later opening of the sealed envelope, and, again, it is best that the length of the adhesive tape 10 is less than that of the package to which it is applied.

In addition to boxes and envelopes, the adhesive tape can also be applied to other objects and packages, for example, security packages, temporary joints, and the like.

The use of combination closure and tear tapes as described herein has the advantage of greatly facilitating the processes of manufacturing and using objects containing such tapes. In the prior art, where separate closure and tear tapes have been routinely applied, it has been necessary to apply such tapes separately to the objects intended to contain them. Also, it has been necessary to purchase and keep in inventory two separate tapes. Accordingly, the use of combination closure and tear tapes as described herein greatly simplifies the manufacturing process of such objects.

Also, in the prior art, where objects have been adapted so that the closure tape serves both functions of sealing the object and later opening it, such tapes have often failed so that the object can no longer be opened by pulling on the tapes. Accordingly, the use of combination closure and tear tapes as described herein provides at the same time a means of sealing the objects and a reliable means for later opening it.

The embodiment described above can be explained in even greater detail with reference to the following example.

EXAMPLE

An adhesive tape according to the present invention is constructed and employed as follows:

The double-sided closure tape has a film carrier, both sides of the film are coated with pressure-sensitive adhesive. The tear strip is laminated onto the closure tape. A release liner, such as the tape given the internal designation "SR1," which contains a polyester backing coated on both sides with a synthetic rubber pressure-sensitive adhesive, is applied to the tape on the side thereof bearing the tear strip.

This combination tape, can then be applied onto the upper flap of the boxes or envelopes (the adhesive side of the closure tape, that being the side opposite the tear strip bearing side, is bonded onto this upper flap of the box). The tear strip should align with the perforations on the box for initiation of the opening later. It is better that the tape does not extend all the way to the edges of the flap but leaves –¼" blanks (not covered with tape) on both sides of the flap.

During the closure operations, the release liner is removed; the other adhesive side of the tape is exposed, and bonded onto the container portion of the box to complete the closure.

During the opening, the tearing is initiated by the perforated portion of the upper flap and continued by this strong tear strip. The tear strip is able to break away from the closure tape easily because of structure of the tape, such as a tissue tape. After the tear strip is removed the opening operation is then completed.

It should be understood that the preceding is merely a detailed description of the depicted embodiments of this invention and that numerous changes to the depicted embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An adhesive tape comprising:
    a) a double-sided adhesive closure tape comprising a backing and pressure-sensitive adhesive applied to both sides of said backing;
    b) a tear strip laminated onto one side of said double-sided adhesive closure tape; and
    c) a release liner applied to said one side of said double-sided adhesive closure tape;
wherein the tear strip is laminated adjacent a first lateral edge of the closure tape and forms a tear strip region thereon, and wherein the width of the release liner extends from an opposite second lateral edge of the closure tape at least into a portion of the tear strip region.

2. The adhesive tape according to claim 1, wherein the tear strip is laminated adjacent a first lateral edge of the closure tape.

3. The adhesive tape according to claim 1, wherein the release liner extends from the second lateral edge to the first lateral edge of the closure tape.

4. The adhesive tape according to claim 1, wherein the tear strip forms a tear strip region on the closure tape, and wherein the width of the release liner extends from at least one lateral edge of the closure tape at least into a portion of the tear strip region.

5. The adhesive tape according to claim 4, wherein the release liner extends from both lateral edges of the closure tape.

6. The adhesive tape according to claim 5, wherein the release liner has a longitudinal split in the tear strip region.

7. The adhesive tape according to claim 1, wherein said backing is a tissue backing.

8. The adhesive tape according to claim 1, wherein said backing is an adhesive film backing.

9. The adhesive tape according to claim 1, wherein the width of the tear strip is less than the width of the double-sided adhesive closure tape.

10. A roll of adhesive tape according to claim 1.

11. A spool comprising a traverse-wound roll according to claim 7.

12. An envelope comprising an adhesive tape according to claim 1.

13. A box comprising an adhesive tape according to claim 1.

14. An adhesive tape comprising:
   a) a double-sided adhesive closure tape comprising a backing and pressure-sensitive adhesive applied to both sides of said backing;
   b) a tear strip laminated onto one side of said double-sided adhesive closure tape; and
   c) a release liner applied to said one side of said double-sided adhesive closure tape;
wherein the tear strip forms a tear strip region on the closure tape, and wherein the width of the release liner extends from at least one lateral edge of the closure tape at least into a portion of the tear strip region.

15. The adhesive tape according to claim 14, wherein the tear strip is laminated adjacent a first lateral edge of the closure tape.

16. The adhesive tape according to claim 14, wherein the tear strip is laminated adjacent a first lateral edge of the closure tape and forms a tear strip region thereon, and wherein the width of the release liner extends from an opposite second lateral edge of the closure tape at least into a portion of the tear strip region.

17. The adhesive tape according to claim 14, wherein the release liner extends from the second lateral edge to the first lateral edge of the closure tape.

18. The adhesive tape according to claim 14, wherein the release liner extends from both lateral edges of the closure tape.

19. The adhesive tape according to claim 14, wherein the release liner has a longitudinal split in the tear strip region.

20. The adhesive tape according to claim 14, wherein said backing is a tissue backing.

21. The adhesive tape according to claim 14, wherein said backing is an adhesive film backing.

22. The adhesive tape according to claim 14, wherein the width of the tear strip is less than the width of the double-sided adhesive closure tape.

23. A roll of adhesive tape according to claim 14.

24. A spool comprising a traverse-wound roll according to claim 19.

25. An envelope comprising an adhesive tape according to claim 14.

26. A box comprising an adhesive tape according to claim 14.

* * * * *